Oct. 13, 1931.  A. W. AUSTIN  1,827,062
PIE CRUST SEAL
Filed April 7, 1930
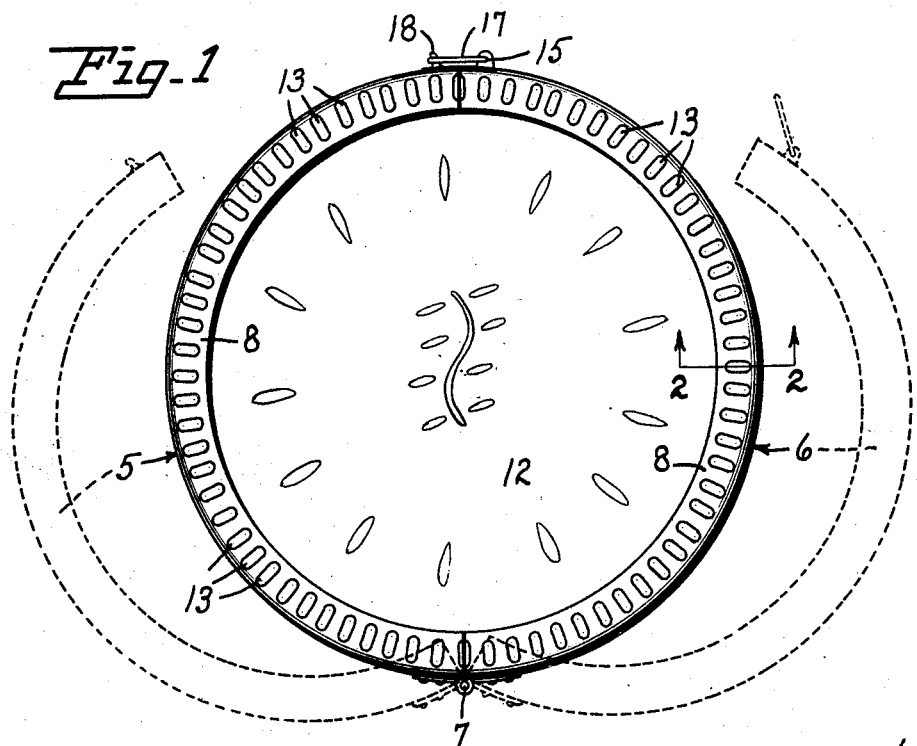
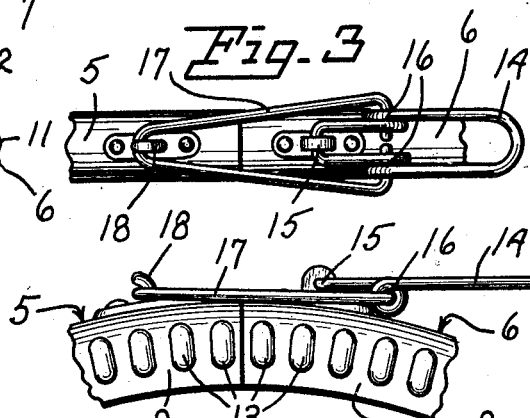
Inventor
Agnes W. Austin
By 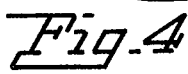
Attorney Patented Oct. 13, 1931

1,827,062

UNITED STATES PATENT OFFICE

AGNES W. AUSTIN, OF BOVILL, IDAHO

PIE CRUST SEAL

Application filed April 7, 1930. Serial No. 442,106.

My invention relates to pie crust seals and certain objects of the invention are to provide a seal comprising two semi-annular pivotally connected members that are adapted to be clamped around the rim of a pie-plate for the purpose of sealing the edges of the upper and lower crusts of a pie together when baking thus preventing the contents of the pie from escaping during the cooking process, preventing the pie from "running over," forming a clean cut edge for the baked pie and preventing the edge portion from burning. Another object is to provide a series of upwardly pressed embossments for the upper flange of the semi-annular members whereby the flanged edge portion of the baked pie is given a decorative effect and the upper pie crust is prevented from shrinkage during the baking of the pie. Further objects are to provide improved loop and lever clasp means and adjustable hinge means for the semi-annular members.

With the above and other objects in view which will appear as the description proceeds, the invention consists of the novel construction, adaptation, combination and arrangement of parts hereinafter described and claimed. These objects are accomplished by devices illustrated in the accompanying drawings; wherein:—

Figure 1 is a top plan view of the device showing in full lines the two semi-annular members clasped together in the operative position, and showing in dotted lines the released position of said members;

Fig. 2 is a fragmentary view in vertical section taken substantially on a broken line 2, 2 of Fig. 1;

Fig. 3 is a detail view in side elevation showing the improved clasp means;

Fig. 4 is a detail plan view of the same; and

Fig. 5 is a fragmentary view in horizontal section showing a modified form of adjustable hinge.

Referring to the drawings throughout which like reference numerals indicate like parts, the numerals 5 and 6 designate two complementary semi-annular members that are pivotally or hingedly connected at 7.

Referring particularly to Fig. 2, said members are U-shaped in cross section with their upper and lower flanges 8 and 9 disposed at a sufficient distance apart to snugly embrace the flange 10 of the pie-plate together with the flanged edge portion 11 of the lower pie crust and the edge portion 12 of the upper pie crust.

The upper flanges 8 of the semi-annular members 5 and 6 are provided with a plurality of closely spaced raised embossments 13 that are pressed upwardly from the flange metal. The edge portion 12 of the upper pie crust protrudes into said embossments, as shown in Fig. 2 when the device is installed in place, thus providing means for preventing shrinkage of the upper crust when baking, and providing a series of raised figures extending around the pie crust edge that is decorative and pleasing in appearance.

My improved clasp means comprises a link and lever arrangement that is clearly shown in Figs. 3 and 4 of the drawings. The lever member 14 is pivoted at 15 to the abutting end portion of the semi-annular member 6 and is provided with a pair of pivot loops 16. The link member 17 has its deflected ends pivotally disposed in said loops and its remote or closed end is arranged to be caught on a hook 18 secured to the abutting end portion of the semi-annular member 5 with said lever in the raised position. Thus when said lever is pressed down the link will draw the end portions of the semi-annular members into abutment as will be understood.

In Fig. 5 of the drawings a modified form of hinge is shown that may take the place of the pivot hinge 7 shown in Fig. 1. In this form a plurality of holes 19 are provided in the semi-annular member 6 and a prong 20 bent to form a shoulder 21 is provided on the end of the member 5. Said prong may be inserted into the different holes thus providing means whereby the semi-annular members are adapted to fit around pie-plates of different sizes.

Having thus described my invention, it being understood that minor changes may be resorted to in its construction and arrangement without departing from the scope and spirit of the invention, what I claim and desire to secure by Letters Patent of the United States is:—

1. A pie crust seal comprising, a pair of semi-circular members pivotally connected together and having its ends at the pivotal connection overlapping and slidably connected together, one of said members having its end opposite the pivotal connection offset in concentric relation with the corresponding end of the other member, and having a laterally projecting extension, and said latter member being provided with a series of spaced perforations to selectively receive said extension.

2. A pie crust seal comprising a pair of semi-circular members pivotally connected together and having its ends at the pivotal connection in overlapping relation, one of said members having its end portion in outwardly offset relation to slidably receive the corresponding end of the other member and having an inwardly projecting extension, and said latter member being provided with circumferentially spaced perforations to selectively receive said extension.

In testimony whereof I affix my signature.

AGNES W. AUSTIN.